(12) United States Patent
Guim Bernat et al.

(10) Patent No.: US 10,785,295 B2
(45) Date of Patent: Sep. 22, 2020

(54) FABRIC ENCAPSULATED RESILIENT STORAGE

(71) Applicant: Intel Corporation, Santa Clara, CA (US)

(72) Inventors: Francesc Guim Bernat, Barcelona (ES); Daniel Rivas Barragan, Cologne (DE); Kshitij A. Doshi, Tempe, AZ (US); Mark A. Schmisseur, Phoenix, AZ (US); Steen Larsen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 290 days.

(21) Appl. No.: 15/199,572

(22) Filed: Jun. 30, 2016

(65) Prior Publication Data
US 2018/0007134 A1 Jan. 4, 2018

(51) Int. Cl.
*H04L 29/08* (2006.01)
*G06F 3/06* (2006.01)
*H04L 12/931* (2013.01)

(52) U.S. Cl.
CPC ........ *H04L 67/1095* (2013.01); *G06F 3/0605* (2013.01); *G06F 3/067* (2013.01); *G06F 3/0617* (2013.01); *G06F 3/0619* (2013.01); *G06F 3/0644* (2013.01); *G06F 3/0649* (2013.01); *G06F 3/0685* (2013.01); *H04L 49/356* (2013.01); *H04L 67/1097* (2013.01); *H04L 67/303* (2013.01)

(58) Field of Classification Search
CPC ..... H04L 51/046; H04L 51/066; H04L 51/02; H04L 51/08; H04L 67/2823; H04L 61/307; H04L 61/303; H04L 61/1511

USPC .......................................................... 709/203
See application file for complete search history.

(56) References Cited

U.S. PATENT DOCUMENTS

| 6,640,278 | B1 * | 10/2003 | Nolan | G06F 3/0601 |
| | | | | 707/999.001 |
| 7,254,577 | B2 * | 8/2007 | Gupta | G06F 16/84 |
| 7,275,103 | B1 * | 9/2007 | Thrasher | H04L 45/22 |
| | | | | 709/223 |
| RE43,346 | E * | 5/2012 | Miloushev | G06F 11/1076 |
| | | | | 709/213 |

(Continued)

OTHER PUBLICATIONS

Hierarchy. Dictionary.com Unabridged. Based on the Random House Unabridged Dictionary, © Random House, Inc. 2019. From the Internet <URL: https://www.dictionary.com/browse/hierarchy>. (Year: 2019).*

(Continued)

*Primary Examiner* — Abdullahi E Salad
(74) *Attorney, Agent, or Firm* — Alliance IP, LLC (57) ABSTRACT

Fabric encapsulated resilient storage is hardware-assisted resilient storage in which the reliability capabilities of a storage server are abstracted and managed transparently by a host fabric interface (HFI) to a switch. The switch abstracts the reliability capabilities of a storage server into a level of resilience in a hierarchy of levels of resilience. The resilience levels are accessible by clients as a quantifiable characteristic of the storage server. The resilience levels are used by the switch fabric to filter which storage servers store objects responsive to client requests to store objects at a specified level of resilience.

16 Claims, 8 Drawing Sheets

(56) References Cited

U.S. PATENT DOCUMENTS

| | | | | |
|---|---|---|---|---|
| 8,443,163 B1* | 5/2013 | Bailey | G06F 3/0605 | 711/114 |
| 8,443,369 B1* | 5/2013 | Bailey | G06F 3/0631 | 718/104 |
| 9,639,555 B1* | 5/2017 | Faibish | G06F 3/06 | |
| 9,697,061 B1* | 7/2017 | Lazier | G06F 9/547 | |
| 9,817,710 B2* | 11/2017 | Gupta | G06F 11/0793 | |
| 2001/0049779 A1* | 12/2001 | Shimada | G06F 3/0601 | 711/205 |
| 2002/0103943 A1* | 8/2002 | Lo | H04L 29/06 | 710/2 |
| 2003/0149770 A1* | 8/2003 | Delaire | G06F 3/0601 | 709/226 |
| 2004/0064534 A1* | 4/2004 | Rabe | H04L 67/1097 | 709/222 |
| 2004/0133650 A1* | 7/2004 | Miloushev | G06F 16/1824 | 709/213 |
| 2004/0194095 A1* | 9/2004 | Lumb | G06F 9/4887 | 718/100 |
| 2005/0108444 A1* | 5/2005 | Flauaus | H04L 41/0853 | 710/15 |
| 2006/0112253 A1* | 5/2006 | Takeda | G06F 11/008 | 711/170 |
| 2006/0136354 A1* | 6/2006 | Bell | G06F 17/30592 | |
| 2006/0206603 A1* | 9/2006 | Rajan | G06F 3/0605 | 709/223 |
| 2006/0209677 A1* | 9/2006 | McGee | H04L 12/44 | 370/216 |
| 2006/0224736 A1* | 10/2006 | Graziado | G06F 17/30575 | 709/225 |
| 2006/0271677 A1* | 11/2006 | Mercier | G06F 16/1824 | 709/224 |
| 2007/0028068 A1* | 2/2007 | Golding | G06F 3/0605 | 711/170 |
| 2007/0094393 A1* | 4/2007 | Cochran | G06F 3/0605 | 709/226 |
| 2008/0221856 A1* | 9/2008 | Dubnicki | G06F 3/067 | 703/21 |
| 2008/0228987 A1* | 9/2008 | Yagi | G06F 3/0614 | 710/316 |
| 2009/0080428 A1* | 3/2009 | Witkowski | H04L 49/352 | 370/392 |
| 2010/0287141 A1* | 11/2010 | Prahlad | G06F 3/0607 | 707/645 |
| 2011/0161626 A1* | 6/2011 | Mangione-Smith | H04L 47/823 | 712/29 |
| 2011/0211442 A1* | 9/2011 | Cheung | H04Q 3/0087 | 370/217 |
| 2012/0137066 A1 | 5/2012 | Nolterieke et al. | | |
| 2012/0266011 A1* | 10/2012 | Storer | G06F 11/1092 | 714/1 |
| 2013/0013767 A1* | 1/2013 | Stober | G06F 9/44505 | 709/224 |
| 2013/0282976 A1 | 10/2013 | Dubnicki | | |
| 2013/0311823 A1 | 11/2013 | Kaplan et al. | | |
| 2013/0326064 A1* | 12/2013 | Gulati | G06F 9/5061 | 709/226 |
| 2014/0172930 A1 | 6/2014 | Molaro et al. | | |
| 2014/0379921 A1* | 12/2014 | Morley | H04L 67/10 | 709/226 |
| 2015/0081893 A1* | 3/2015 | Chadwell | G06F 3/0659 | 709/224 |
| 2015/0088827 A1* | 3/2015 | Xu | G06F 3/0605 | 707/634 |
| 2015/0207719 A1* | 7/2015 | Chakhaiyar | H04L 49/356 | 370/252 |
| 2015/0236895 A1* | 8/2015 | Kay | H04L 43/045 | 709/224 |
| 2015/0333994 A1* | 11/2015 | Gell | H04L 43/0882 | 709/224 |
| 2016/0062674 A1 | 3/2016 | Benight et al. | | |
| 2016/0062795 A1* | 3/2016 | Hu | H04L 47/783 | 718/104 |
| 2016/0173499 A1* | 6/2016 | Bianchi | H04L 63/105 | 726/26 |
| 2016/0283512 A1* | 9/2016 | Beale | G06F 16/13 | |
| 2017/0026263 A1* | 1/2017 | Gell | G06F 16/1844 | |
| 2017/0034023 A1* | 2/2017 | Nickolov | H04L 43/0817 | |
| 2017/0171106 A1* | 6/2017 | Woo | H04L 47/805 | |
| 2017/0185321 A1* | 6/2017 | Bent | G06F 3/0619 | |
| 2017/0359413 A1* | 12/2017 | Miller | H04L 41/5054 | |
| 2019/0260658 A1* | 8/2019 | Gell | G06F 3/0605 | |

OTHER PUBLICATIONS

Abstract. Dictionary.com Unabridged. Based on the Random House Unabridged Dictionary, © Random House, Inc. 2019. From the Internet: <URL: https://www.dictionary.com/browse/abstract>. (Year: 2019).*

International Search Report and Written Opinion received for PCT Patent Application No. PCT/US2017/033108, dated Jul. 24, 2017, 15 pages.

European Search Report for Application No. 17820749.4, dated Jan. 28, 2020, 53 pages.

* cited by examiner

FABRIC ENCAPSULATED RESILIENT STORAGE

TECHNICAL FIELD

The technical field relates generally to storage systems and, in particular, to resilient storage systems.

BACKGROUND ART

In distributed storage infrastructures used in enterprise and cloud computing environments, reliability and protection against loss/inconsistency of data are critical requirements, alongside high performance and cluster scalability.

To meet these critical requirements resilient storage systems maintain redundant copies (replicas) of information, particularly for data that is operationally critical. Storage is considered resilient when replicated information is available from more than one storage element, the paths to the storage elements have independent failure modes, and updates to objects stored on the storage elements are consistent and durable.

Existing resilient storage systems typically require proprietary hardware-software storage area network (SAN) and/or network-attached storage (NAS) appliances. At each SAN/NAS access point data is organized into various structures such as tables, namespaces, volumes, file systems, etc., and the lowest level raw storage blocks are viewed collectively as a homogeneous pooled resource. The structures incorporate the required resiliency characteristics using a storage management software layer such as the multiple application programming interfaces (APIs), access, protocols, security provisions, etc. to minimize the complexity of storage management for the upper layers of software.

BRIEF DESCRIPTION OF THE DRAWINGS

The described embodiments are illustrated by way of example and not limitation in the figures of the accompanying drawings, in which like references indicate similar elements and in which.

Other features of the described embodiments will be apparent from the accompanying drawings and from the detailed description that follows.

DESCRIPTION OF THE EMBODIMENTS

In existing storage systems, it is particularly cumbersome to add new storage capacity without bringing it under the purview of the storage management software layer. As a consequence, when infrastructure ages, capacity requirements grow, and/or upgrades become necessary, either wholesale replacement or significant revamping of such SAN/NAS-furnished distributed storage often becomes the only practical choice.

In addition to being inflexible, another drawback of providing resilient storage using a storage management software layer is the lack of transparency in determining storage reliability. In general, storage device reliability varies considerably, both across hard disk drives (HDD) and solid-state drives (SSD). For example, studies show that disk error rates in both types of storage drive change over time and with different levels of write stress. Thus, it may be appreciated that from one application to another, and from one subset of objects to another, and in consideration of other factors such as runtime metrics, the degree of replication that needs to be applied in order to achieve desired level of availability could vary greatly over time depending on the type of storage devices in use, e.g. SSD, HDD.

In addition, storage management software typically monitors the level of reliability of all storage servers in a cluster before deciding where to store a given object. While that approach can be workable for static systems, it is not feasible for larger or dynamic scale-out systems. Dynamic systems in particular are a very popular and inexpensive solution for growing cluster storage capacity and results in frequent changes to the number and type of storage servers making it difficult if not impossible to decide beforehand where to store a given object at a particular level of reliability.

To address the lack of flexibility and transparency present in existing software storage management systems, the described embodiments provide a hardware-assisted storage management system referred to herein as a fabric encapsulated resilient storage.

In one embodiment, a switch abstracts a server's storage characteristics. The storage characteristics include static characteristics and/or dynamic characteristics continuously updated over time.

In one embodiment, the static characteristics are typically those characteristics that are fixed, such as the type of storage technology, e.g., HDD, SSD, or other quantifiably objective data such as the number of disks and technical specifications for the storage technology, including the drive manufacturer's measure of mean time between failures (MTBF), bit error rates, and the like.

In one embodiment, the server's storage characteristics can include a predefined reliability factor that functions as an indicator of reliability of a given storage server, including a reliability factor that indicates reliability of a given storage server relative to another storage server in a particular operating environment.

In one embodiment, the switch updates the dynamic storage characteristics, i.e. the characteristics that can change over time. For example, the switch updates the dynamic characteristics indicating the server's current availability and load, or any other dynamic information that could affect the reliability of the storage server. In some embodiments, the aforementioned reliability factor may be administratively or programmatically updated to reflect current reliability, which may differ from past reliability due to the age of the hardware, current status of the hardware's configuration or operating system and the like.

In one embodiment, the switch exposes the above-referenced abstraction of storage characteristics to client computing nodes through the switch's host fabric interface (HFI).

In a typical embodiment, the switch abstracts the storage characteristics of each storage node participating in fabric encapsulated resilient storage into a level of resiliency in a hierarchy of levels of resiliency. A client node can access the hierarchy of levels of resiliency via the HFI. The hierarchy of levels of resiliency is typically represented using a range of values, where each value corresponds to a single level of resiliency in the hierarchy. Each level of resiliency is used to represent how reliably a storage node is able to store/replicate objects based on the storage node's current storage characteristics.

In one embodiment, the range of values used for the hierarchy of levels of resiliency can be flexibly configured to be any arbitrary range of values, including numeric or alphanumeric values, as long the configured range of values is sufficiently granular to represent the full gamut of reliability of the storage nodes that the switch can access and/or to fulfill the resilient storage requirements of the computing environment using fabric encapsulated resilient storage.

For example, in one embodiment, instead of relying on a software stack implementing a proprietary software storage management system, an application of a computing node, or an application interface on the application's behalf, can specify to the switch, via the HFI, through either in-band or out-of-band communications, which data objects, from small objects to a multi-gigabyte binary large objects, require resilient storage at a particular resiliency level without regard to how the resilient storage is achieved, including without regard to where the object is stored or how many times it is replicated. The value of the specified resiliency level, such as level 3 from a range of values from 1 to 5, or level 7 in a range of values from 1 to 10, and so forth, reflects the arbitrary and flexible nature of the granularity of resilience facilitated in embodiments of fabric encapsulated resilient storage.

In one embodiment, in response to the application interface specifying the particular resiliency level of the requested resilient storage, the storage cloud/datacenter infrastructure dynamically provides the required level of resiliency when storing/replicating the data object using fabric encapsulated resilient storage as will be explained in further detail in the description that follows. In this manner, the switch fabric enables the storage cloud/datacenter infrastructure to assist in meeting the demand for resilient storage while retaining flexibility and control over how the demand for resilient storage is met.

For example, a storage server can implement a particular type of resiliency since there are many options already available, such as Intel® Rapid Storage Technology enterprise (Intel® RSTe to implement various translation maps to keep track of where various copies of blocks reside, and to repair information and remap as conditions change. Further, using such internal translations/maps, a storage server may implement a variety of firmware or embedded-software based methods to provide a requested level of resiliency.

In one embodiment, the fabric encapsulated resilient storage encapsulates the above described and other hardware and memory-based resiliency protocols, and transparently facilitates, via the HFI, the application/middleware's requested level of resiliency. By separating the implementation of the requested level of resiliency from the software stack, fabric encapsulated resilient storage advantageously allows the storage server to implement background block remapping not only within a single device, but also across different devices at different times to benefit fully from non-correlated reliability characteristics of independent devices. For the same reason, fabric encapsulated resilient storage advantageously protects against sustained attempts on the part of a rogue application to probe for, and attack, points of vulnerability in the storage cloud/datacenter infrastructure.

In the description that follows, examples may include subject matter such as a method, a process, a means for performing acts of the method or process, an apparatus, a switch, and a system for a fabric-encapsulated resilient storage, and at least one machine-readable tangible storage medium including instructions that, when performed by a machine or processor, cause the machine or processor to performs acts of the method or process according to embodiments and examples described herein Numerous specific details are set forth to provide a thorough explanation of embodiments of the methods, media and systems for providing fabric encapsulated resilient storage. It will be apparent, however, to one skilled in the art, that an embodiment can be practiced without one or more of these specific details. In other instances, well-known components, structures, and techniques have not been shown in detail so as to not obscure the understanding of this description.

Reference in the specification to "one embodiment" or "an embodiment" means that a particular feature, structure, or characteristic described in connection with the embodiment can be included in at least one embodiment. The appearances of the phrase "in one embodiment" in various places in the specification do not necessarily all refer to the same embodiment.

The methods, processes and logic depicted in the figures that follow can comprise hardware (e.g. circuitry, dedicated logic, fabric, etc.), software (such as is run on a general-purpose computer system or a dedicated machine, e.g. a switch, forwarding device), and interfaces (such as a host fabric interface, or HFI) between hardware and software, or a combination of both. Although the processes and logic are described below in terms of some sequential operations, it should be appreciated that some of the operations described can be performed in a different order. Moreover, some operations can be performed in parallel rather than sequentially.

In any one or more of the embodiments of the systems, apparatuses and methods herein described, fabric encapsulated resilient storage includes a switch having access to storage nodes and client nodes, where the switch abstracts characteristics of each storage node into a level of resilience in a hierarchy of levels of resilience, the abstracted level of resilience representing how reliably each storage node stores objects. The switch causes the object to be stored on one or more of the storage nodes based on their respective abstracted levels of resilience after receiving from the client node a request to store the object at a specified level of resilience, determining which storage nodes store objects at the specified level of resilience, and initiating a replication flow of messages to cause the object to be stored on the storage nodes that store objects at the specified level of resilience.

In any one or more of the embodiments of the systems, apparatuses and methods herein described, the switch configures a host fabric interface (HFI) with the hierarchy of levels of resilience, wherein the level of resilience specified in a client's request to store an object is obtained through the HFI. In the event that the switch determines that none of the storage nodes store objects at the specified level of resilience, then the switch forwards the request to a partner switch configured to access other storage nodes that store objects at the specified level of resilience. In some cases the switch receives requests to store objects from a storage node unable to store the object at the specified level of resilience.

In any one or more of the embodiments of the systems, apparatuses and methods herein described, the switch configures a granularity of the hierarchy of levels of resilience into which characteristics of each storage node are abstracted. When the hierarchy of levels is configured with greater granularity the switch abstracts the storage characteristics into a greater number of levels of resilience than when the hierarchy of levels is configured with lesser granularity.

In any one or more of the embodiments of the systems, apparatuses and methods herein described, how reliably a storage node stores objects represents one or more of an assurance of availability of stored objects and a protection against loss of stored objects, the assurance of availability and the protection against loss inferred from the storage characteristics of the storage node.

In any one or more of the embodiments of the systems, apparatuses and methods herein described, the characteristics of a storage node or storage server that a switch can abstract into a level of resilience can include any one or more of a static characteristic and a dynamic characteristic, where the static characteristic is any one or more of a predefined reliability factor quantifying a reliability profile of the storage node, a number of disks comprising the storage node, and a type of disk technology used by the storage node, and where the dynamic characteristic is any one or more of a load and an availability of the storage node over time.

In any one or more of the embodiments of the systems, apparatuses and methods herein described, the switch registers the storage characteristics in a switch memory and the switch processor is configured to abstract the stored characteristics of each storage server into a level of resilience in a hierarchy of levels of resilience. In one embodiment of the system, the switch fabric is configured to cause objects to be stored on one or more of the storage servers based on their respective abstracted levels of resilience.

In any one or more of the embodiments of the systems, apparatuses and methods herein described, the switch host fabric interface (HFI) is configured to expose the hierarchy of levels of resilience to clients in communication with the switch. Client requests to store objects are queued to an ingress queue, and the switch processor is further configured to determine which storage servers store objects at a requested level of resilience responsive to receiving a request from a client to store an object at the requested level of resilience.

In any one or more of the embodiments of the systems, apparatuses and methods herein described, the switch fabric initiates the replication flow of messages to cause the object to be stored on any one or more of the storage servers determined to store objects at the requested level of resilience. In the event that the switch processor determines that none of the storage servers accessible through the switch store objects at the requested level of resilience, then the switch fabric forwards the request to a partner switch configured to access other storage servers that store objects at the requested level of resilience. In some cases the ingress queue receives requests from a remote storage server unable to store objects at the requested level of resilience.

In any one or more of the embodiments of the systems, apparatuses and methods herein described, the switch configures the hierarchy of levels of resilience into which the processor abstracts the characteristics of each storage node to provide clients with varied levels of resilient storage. In any one or more of the embodiments of the systems, apparatuses and methods herein described, the switch's processor is further configured to update the characteristics stored in the switch's memory to reflect changes in the characteristics of the storage servers.

In any one or more of the embodiments of the systems, apparatuses and methods herein described, means for facilitating resilient storage in a computing environment, includes means for communicating with storage nodes having means for storing objects, means for communicating with client nodes, the client nodes having means to request that objects be stored on the storage nodes, means for abstracting characteristics of each storage node into a level of resilience in a hierarchy of levels of resilience, the abstracted level of resilience representing how reliably each storage node stores objects, means for receiving from a client node that an object be stored with a requested level of resilience, means for causing the object to be stored on one or more of the storage nodes with the requested level of resilience based on their respective abstracted levels of resilience.

In any one or more of the embodiments of the systems, apparatuses and methods herein described, means for facilitating resilient storage in a computing environment further includes means for determining which storage nodes store objects at the specified level of resilience, and means for initiating a replication flow of messages to cause the object to be stored on the storage nodes that store objects at the specified level of resilience.

In any one or more of the embodiments of the systems, apparatuses and methods herein described, means for facilitating resilient storage in a computing environment further includes means for configuring a host fabric interface (HFI) with the hierarchy of levels of resilience into which the characteristics of each storage node are abstracted and means for exposing the hierarchy of levels of resilience in the wherein the requested level of resilience is obtained through the HFI.

In any one or more of the embodiments of the systems, apparatuses and methods herein described, means for facilitating resilient storage in a computing environment further includes means for configuring a granularity of the hierarchy of levels of resilience into which characteristics of each storage node are abstracted, wherein hierarchies configured with greater granularity cause the storage characteristics to be abstracted into a greater number of levels of resilience than hierarchies configured with lesser granularity.

In any one or more of the embodiments of the systems, apparatuses and methods herein described, means for facilitating resilient storage in a computing environment further includes means for determining none of the storage nodes store objects at the requested level of resilience and means for forwarding the request to another system in the computing environment having means for communicating with other storage nodes that store objects at the requested level of resilience.

In any one or more of the embodiments of the systems, apparatuses and methods herein described, means for facilitating resilient storage in a computing environment further includes means for receiving the request from a storage node unable to store the object at the specified level of resilience.

In any one or more of the embodiments of the systems, apparatuses and methods herein described, means for facilitating resilient storage in a computing environment further includes means for registering the characteristics of the storage nodes in a memory for subsequent access by the means for determining which storage nodes store objects at the specified level of resilience and means for updating the registered characteristics in the memory to reflect changes in the characteristics of the storage nodes.

In one embodiment, at least one computer-readable storage medium includes instructions that, when executed on one or more processors of any one or more of the switches, nodes, clients, servers and interfaces cause the processor(s) to perform any one or more of the embodiments of the systems, apparatuses and methods for fabric encapsulated resilient storage herein described.

Figure 1:
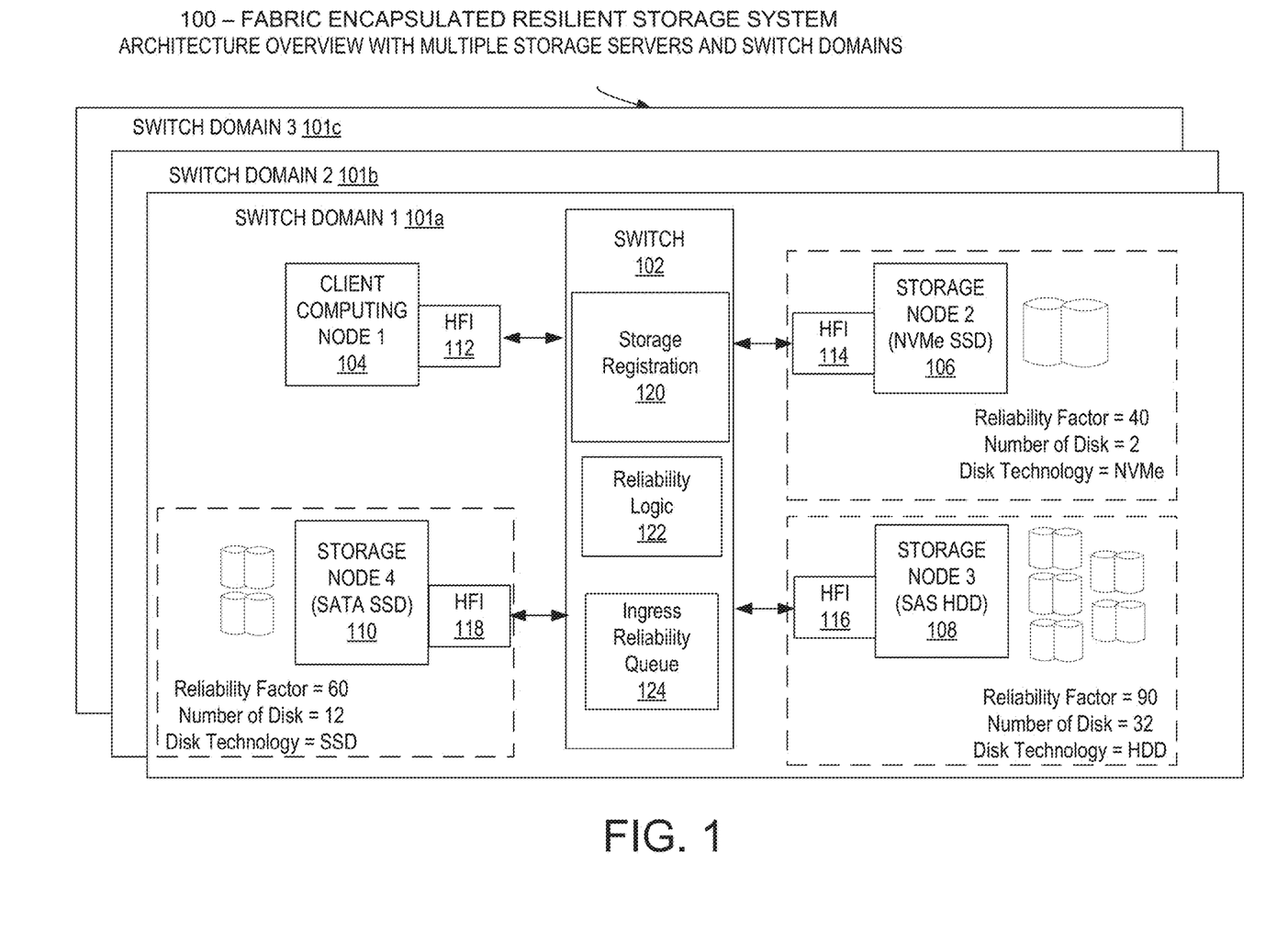
FIG. 1 is a block diagram illustrating one embodiment of fabric encapsulated resilient storage system.

FIG. 1 is a block diagram illustrating one embodiment of a fabric encapsulated resilient storage, including an architectural overview employing multiple storage servers and switch domains. It should be noted that the number of storage servers and/or switch domains illustrated in FIG. 1 and elsewhere in this description is by way of example only; the number of nodes servers, server types, switch domains and the like can vary considerably depending on the implementation.

In the illustrated embodiment of FIG. 1, a switch 102 in switch domain 1 101*a* interfaces via an HFI 112/114/116/118 with a client computing node 1 104, and three storage nodes, storage node 2 106, storage node 3 108 and storage node 4 110 to provide fabric encapsulated resilient storage 100. For purposes of illustration, each storage node is a storage server using a different disk technology (DT), e.g., for storage node 2 106 an SSD using the Non-volatile Memory Express ("NVMe") storage protocol, where NVMe is a logical device interface for accessing non-volatile storage media attached via a Peripheral Component Interconnect Express (PCIe) bus, for storage node 3 108 an HDD using Serial Attached SCSI (small computer systems interface abbreviated as "SAS") storage protocol, and for storage node 4 110, an SSD using Serial Advanced Technology Attachment ("SATA") storage protocol. Each storage node possesses other characteristics as well, such as different reliability factors (RF) and numbers of disks ND, e.g., RF40 and ND2 for storage node 2 106, RF90 and ND 32 for storage node 3 108, and RF60 and ND12 for storage node 4 110.

By way of example only, one switch 102 in switch domain 1 is illustrated. In a typical embodiment, a switch domain, such as switch domain 1 101*a* can contain multiple switches in different configurations to provide fabric encapsulated resilient storage 100 for multiple computing nodes and multiple storage nodes. For example, a configuration utility can place storage servers and switches into static, dynamic, or hybrid arrangements to achieve fabric mediated approaches for delivering high levels of resiliency without being dependent on a software intermediary (such as a file system) for the arrangement.

In the illustrated embodiment, additional switch domains, e.g. switch domain 2 101*b* and switch domain 3 101*c*, represent, for purposes of illustration and by way of example only, that numerous switch domains can be configured to extend fabric encapsulated resilient storage 100 to remote servers/storage nodes registered with other switches. In one embodiment, the remote servers/storage nodes function as resiliency providers having their own resiliency levels, which can be different from resiliency levels available in local storage servers in the local switch domain. In one embodiment, one switch domain can be partnered with other switch domains to extend fabric encapsulated resilient storage across domains. In this manner, embodiments of fabric encapsulated resilient storage can scale with larger architectures and/or dynamic scale-out architectures.

In some embodiments one switch can be partnered with another switch to extend fabric encapsulated resilient storage within a switch domain. For instance, using the illustrated example of FIG. 1, in one embodiment storage node 2 106 can initiate replication on behalf of a multi-storage server group consisting of storage node 2 106 and storage node 3 108. When storage node 2 106 receives a request to store an object with an availability of, for example, 0.999999, but it can only provide 0.999 availability, the storage node 2 106 can use the switch to partner with storage node 3 108 which is capable of providing an additional (independent) 0.999 availability, to achieve the requested availability. For example, storage node 2 106 can forward the request to store the object to the switch 102 which, in turn, determines that storage node 3 108 can store the object with the requested availability.

In one embodiment, the switch 102 includes, among other components, three components for providing fabric encapsulated resilient storage: a storage registration component 120, a reliability logic component 122 and an ingress reliability queue 124.

In one embodiment, the storage registration component 120 maintains updated values for the static and dynamic characteristics of the storage nodes participating in fabric encapsulated resilient storage. The information maintained in storage registration component 120 can be used by the reliability logic component 122 to abstract a level of resilience in the hierarchy of levels of resilience that represents how reliably the storage nodes can store an object, i.e. whether they can achieve a specified level of resilience as requested by a client node 1 104.

In one embodiment, storage registration component 120 can be structured as a table in the switch memory, but other memory structures for storage registration component 120 can be employed as well, such as an array of pointers or other mechanism, as long as the information in storage registration component 120 is accessible by the storage node identifiers and/or any of the static and dynamic characteristics of the storage nodes used to determine the abstracted level of resilience associated with a storage node.

In one embodiment, the reliability logic component 122 is responsible for managing the resiliency message flows that carry out the storage and replication tasks to achieve a specified level of resilience for fabric encapsulated resilient storage. In one embodiment, reliability logic component 122 processes requests from a client node 1 104 to store an object with a specified level of resilience. In one embodiment the requests are received from an ingress reliability queue 124 in which such requests are buffered from the requesting client nodes, e.g. client node 1 104. In one embodiment such requests may originate from a partner storage node or partner switch domain that has determined that it cannot fulfill a request to store an object with the specified level of resilience.

In one embodiment, using the resilience level specified in the queued requests to store an object, the reliability logic component 122 accesses the storage registration component 120 to determine whether the switch 102 has access to any storage nodes 106/108/110 that could achieve the level of resilience specified in the request for the object being stored. In one embodiment, the reliability logic component 122 uses the information obtained from the storage registration component 120 to determine which storage nodes can fulfill the request, i.e. to filter out those storage nodes that cannot achieve the specified level of resilience and filter in those storage nodes that can.

It should be noted that the particular algorithm used in the reliability logic component 122 to filter storage nodes could vary depending on how the switch 102 has been configured to provide fabric encapsulated resilient storage.

For example, in one embodiment, the fabric encapsulated resilient storage can be configured to prioritize certain static or dynamic characteristics of storage nodes over other characteristics. In some embodiments, the fabric encapsulated resilient storage can configure an arbitrary granularity of the hierarchy of levels into which storage characteristics are abstracted, where hierarchies configured with greater granularity cause the storage characteristics to be abstracted into a greater number of levels of resilience than hierarchies configured with lesser granularity. Regardless of the particular algorithm used, given a level of resiliency specified in the request to store an object, and given the static and dynamic characteristics stored in the storage registration component 120, the reliability logic component 122 determines which one or more of the registered storage nodes can store and replicate the object in order to achieve the level of resiliency specified in the request.

Once the one or more registered storage nodes that can store and replicate the object have been determined, the reliability logic component 122 initiates the message flows to store and replicate the object to the determined node(s).

Figure 2:
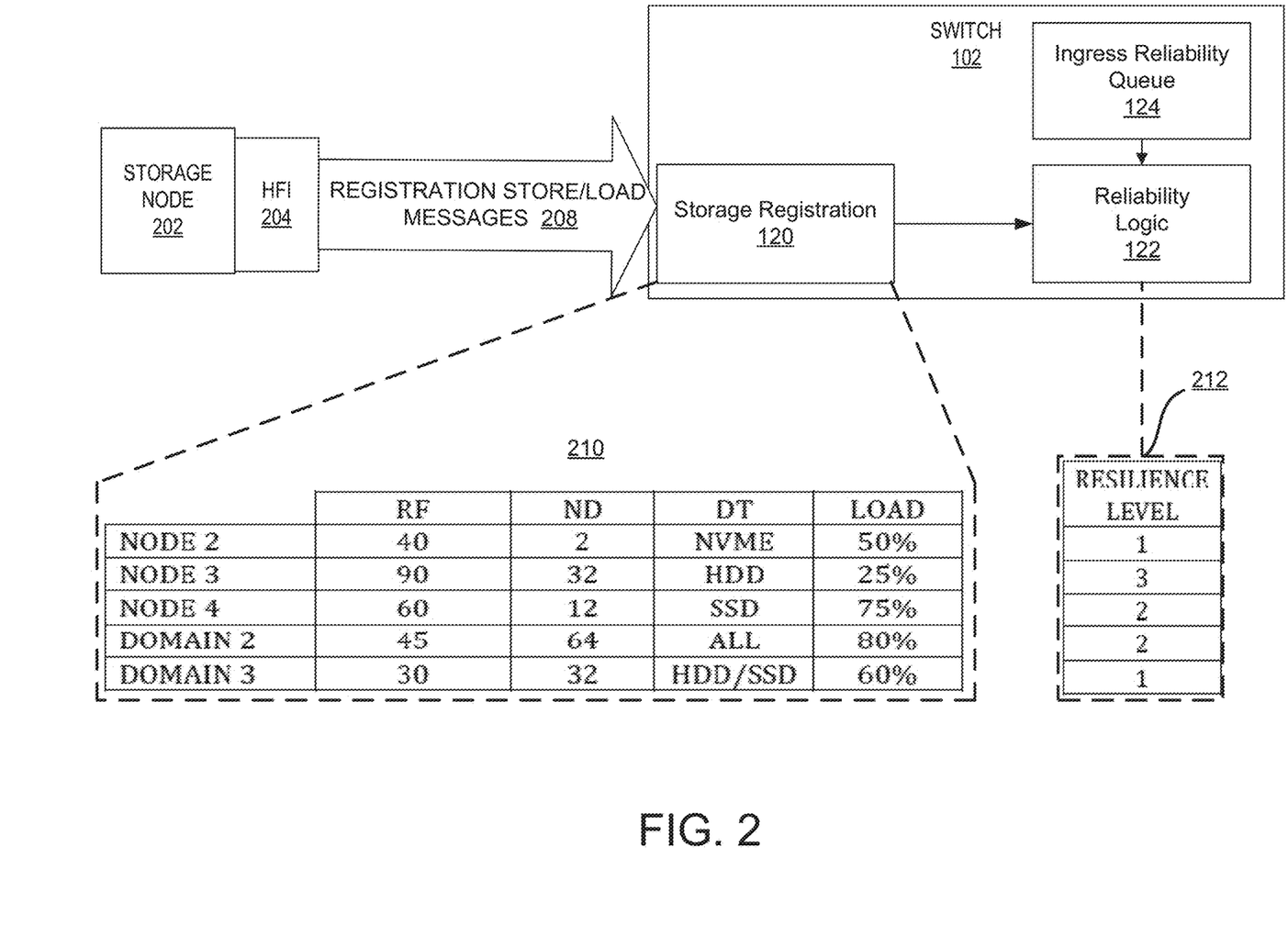
FIG. 2 is a block diagram illustrating an example of stored registration and status data that can be used in accordance with one embodiment of fabric encapsulated resilient storage as shown in FIG. 1.

FIG. 2 is a block diagram illustrating an example of stored registration and status data that can be used in accordance with one embodiment of fabric encapsulated resilient storage as shown in FIG. 1.

In the illustrated scenario, a storage node 202 in switch domain 1 sends a registration store/load message to switch 102 storage registration component 120. By way of example only, after several storage nodes have registered with switch 102, the values in the storage registration component 120 include static and dynamic characteristics such as reliability factor (RF), number of disks (ND), disk technology (DT) and the most recent load information for several storage nodes (2, 3 and 4) as well as registration information for two switch domains (2, 3).

In one embodiment, the storage registration component 120 can also register aggregated information from other switch domains. For example, in the illustrated embodiment of FIG. 2, two switch domains, Domain 2 and Domain 3, are registered with their aggregated characteristics for RF, ND, DT and current load. Using these domains the reliability logic 122 can federate requests from local client nodes to other switch domains to provide higher levels of resilience or to provide client nodes with alternate storage options for levels of resilience that might not currently be available in the local domain. In one embodiment, the client node 1 104 (FIG. 1) sends storage requests directly to a remote switch, i.e. a second-level switch domain, such as Domain 2 101b or Domain 3 101c, which provides access to the other storage server nodes.

In a typical embodiment, each storage server/node provides to the storage registration component 120 the storage node's own RF, ND, DI, and other characteristics from which a level of resilience may be abstracted.

As noted earlier, proprietary software-based storage systems cannot accurately and efficiently determine reliability of storage nodes because of their limited access to current information about the storage nodes, particularly in larger scale-out storage systems that introduce new and different type of storage servers with totally different characteristics. For this reason proprietary software-based storage management systems evaluate reliability based on limited information about static characteristics of the storage nodes, or by the presence or absence of a given characteristic for a particular storage node. In contrast, fabric encapsulated resilient storage overcomes this problem in part by registering directly in the switch a storage node's RF, or reliability factor.

In one embodiment, the RF varies per storage server/node and ranges in value from 0 to 100. Other embodiments use RF values having different ranges. A storage server/node's particular RF value depends on the storage technology, vendor, implementation version, etc. In one embodiment, the RI values may be obtained from a specification sheet and registered with the switch. In one embodiment, characteristics and/or other types of static and dynamic characteristics other than those illustrated are registered to provide additional or alternative information from which a storage node's level of resilience can be abstracted.

In one embodiment, using the registered characteristics 210 in the storage registration component 120, the reliability logic component 122 of switch 102 can abstract the characteristics of each registered storage node into a level of resilience 212 in a hierarchy of levels of resilience. For ease of illustration and by way of example only, FIG. 2 illustrates a hierarchy having just three resilience levels, designated with the numbers "1", "2" and "3" where "1" is the lowest level of resilience for storage nodes that less reliably (or cannot) store objects, and "3" is the highest level of resilience for storage nodes that more reliably store objects. Of course, any particular storage node's abstracted level of resilience can change over time, depending on changes in the dynamic characteristics registered for the storage node, or changes in the configuration of the reliability logic, including changes to the configuration of the granularity of the hierarchy of levels of resilience.

In the illustrated example, Node 2 has a lower reliability factor of 40, a smaller number of disks, 2, and, at 50% load, is currently handling a greater load than node 3 relative to its capacity, whereas Node 3 has a higher reliability factor of 90, a greater number of disks, 32, and, at 25%, is currently handling a smaller load than Node 2 relative to its capacity. Therefore, a lower resilience level of 1 can be abstracted from the characteristics currently registered for Node 2 and a higher resilience level of 3 can be abstracted from the characteristics currently registered for Node 3. Using this example, for any storage requests on the ingress reliability queue 124 that specify a resilience level of 3 the reliability logic 122 causes objects to be stored/replicated to storage Node 3 108 instead of storage Node 2 106.

As noted previously the reliability logic 122 can use other variations in the registered characteristics 210 and other hierarchies of levels of resilience 212 having greater or lesser granularity causing objects to be stored/replicated to one or more different storage nodes participating in fabric encapsulated resilient storage. Embodiments of the fabric encapsulated resilient storage are highly configurable and scalable to manage different and larger architectures of switches, storage nodes and client nodes, the registration of different types of storage characteristics for the storage nodes, as well as different granularities in the hierarchy of resilience levels provided to client nodes.

Figure 3:
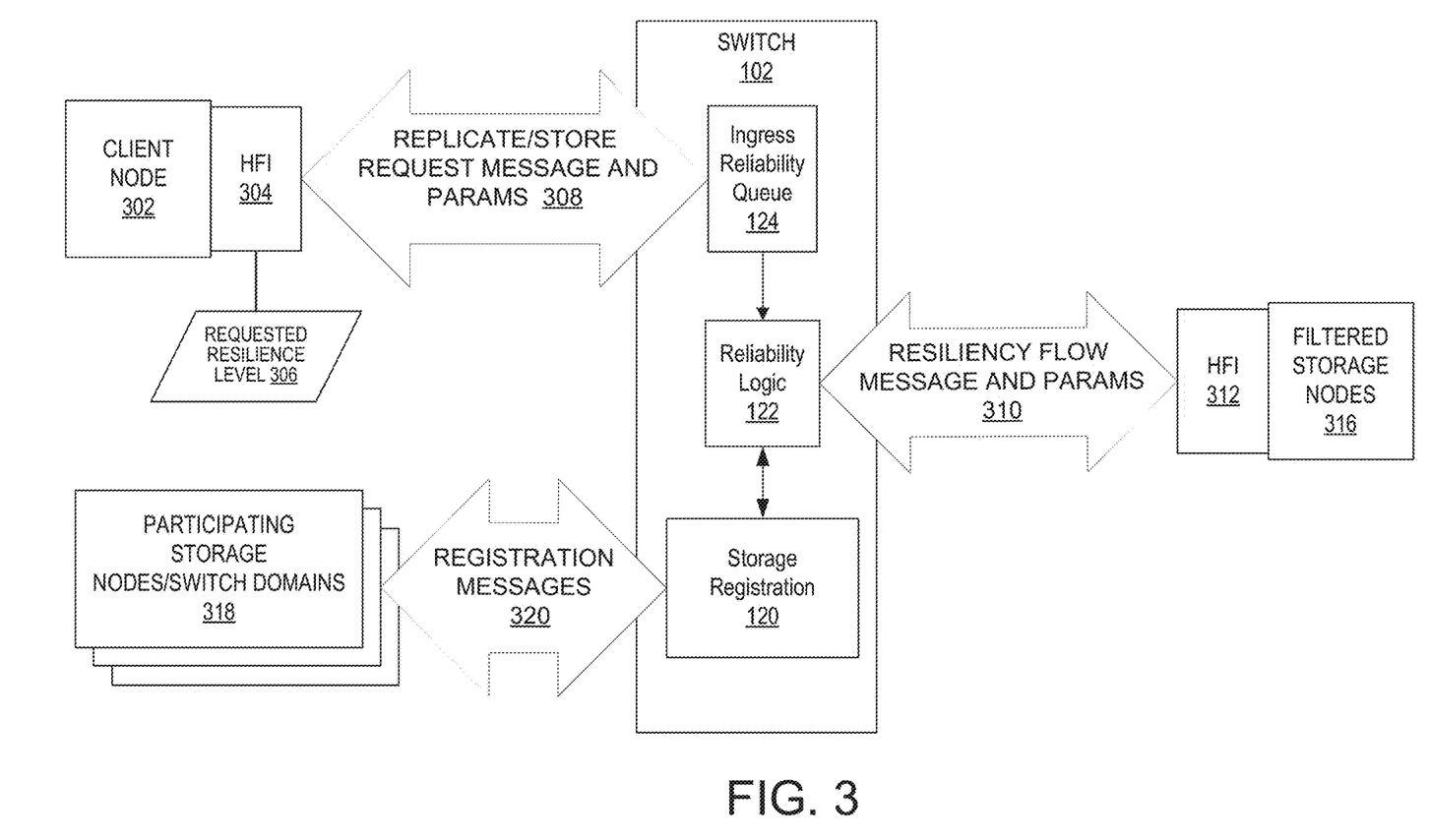
FIG. 3 is a block diagram illustrating in greater detail one embodiment of a fabric encapsulated resilient storage as shown in FIG. 1.

FIG. 3 is a block diagram illustrating in greater detail one embodiment of fabric encapsulated resilient storage as introduced in FIG. 1. Three message flows are illustrated: registration messages 320, replicate/store request messages and parameters 308, and resiliency flow messages and parameters 310. In a typical embodiment the message flows are implemented using transport layer (Layer 4 of the Open Systems Interconnection (OSI) model, also referred to as L4, en.wikipedia.org/wiki/OSI_model) to avoid the need to make changes in other layers of the network architecture.

In one embodiment, participating storage nodes 318 in fabric encapsulated resilient storage initiate registration messages 320 to the switches to which they have access, such as switch 102. The registration messages 320 cause the switch 102 to register the storage characteristics of the participating storage nodes 318 in the storage registration component 120 of the switch. When the participating storage node's 318 characteristics change, additional registration messages 320 are sent to the switch 102 to update the storage characteristics. For example, in one embodiment, should a dynamic characteristic such as the load factor affecting the storage capacity of a particular storage node change over time, the storage node will generate a new registration message 320 with the updated load factor, either periodically, in response to a request from the switch, or in response to a notification alerting the storage node and/or switch about the storage node's current load/capacity.

In another example, in one embodiment, as failures happen inside storage servers/nodes, or bit error rates change, the storage servers/nodes may generate a new registration message 320 to upload the new and updated information about their operational status and/or bit error rates and the like into the switch.

In one embodiment, a client node 302 initiates a replicate/store request message and parameters 308 flow that specifies an object to be stored and a requested resilience level 306 selected from the hierarchy of resilience levels exposed to the client on the HFI 304. The replicate/store request message and parameters 308 flow is queued to the switch's ingress reliability queue 124 to await fabric encapsulated resilient storage processing by the switch.

In one embodiment, a reliability logic component 122 retrieves a queued replicate/store request message and parameters 308 from the ingress reliability queue 124 to perform fabric encapsulated resilient storage processing. In one embodiment, the reliability logic component 122 accesses the current registration information in the storage registration component 120 for each of the registered storage nodes. The reliability logic component 120 proceeds to abstract the current registration information for each storage node participating in fabric encapsulated resilient storage into a level of resiliency in a hierarchy of levels of resiliency. If the abstracted level of resiliency of a registered storage node matches the requested resilience level 306 specified in the retrieved replicate/store request message and parameters 308, then the reliability logic 120 identifies that registered storage node as one of the filtered storage nodes 316 that can provide resilient storage for the object specified in the request. The processes of abstracting the resilience levels of the storage nodes and matching the requested resilience level continues until the registered characteristics for all of the registered storage nodes have been processed. In one embodiment, different techniques for optimizing the abstraction and matching processes can be employed, such as only performing abstraction for a storage node when, in fact, the storage characteristics have changed since the last abstraction.

Figure 4:
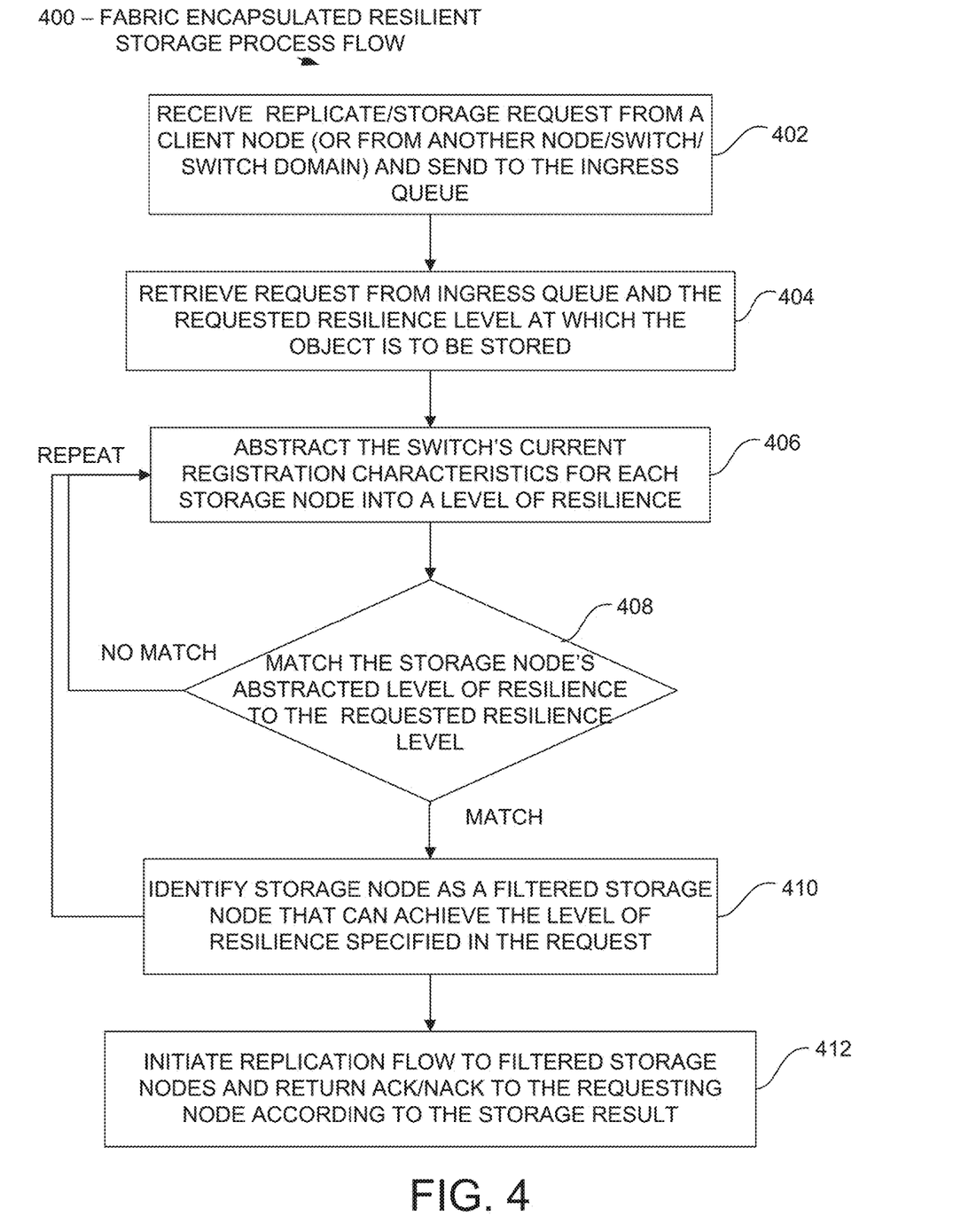
FIG. 4 is a flow diagram illustrating embodiments of processes performed in a switch in accordance with embodiments of fabric encapsulated resilient storage as shown in FIG. 1.

In one embodiment, after or as the filtered storage nodes 316 are identified, the reliability logic component 120 initiates the resilience flow message and parameters 310 to provide the resilient storage for the object specified in replicate/store request message and parameters 308, FIG. 4 is a flow diagram illustrating a summary overview of some of the processes performed in a switch in accordance with embodiments of fabric encapsulated resilient storage as shown in FIG. 1.

In one embodiment, in process 402 a switch receives a replicate storage request to store an object in resilient storage into the switch's ingress queue. The request can originate from a client node or, in some instances, from a federated partner node, partner switch or partner switch domain. At process 404, the switch retrieves the requested resilience level at which the object is requested to be stored.

In one embodiment, at process 406, for each of the storage nodes that have registered with the switch to participate in fabric encapsulated resilient storage, the switch abstracts the current registration characteristics of the storage node into a level of resilience. At decision block 408, the switch compares each abstracted level of resilience to the requested resilience level. At process block 410, each registered storage node that match is identified as a filtered storage node that can store the object at the requested resilience level. The processes in blocks 406, 408 and 410 repeat until all of the registered storage nodes that are candidates for storing the object have been processed.

In one embodiment, at process block 412, the switch initiates the replication flow of messages to the filtered storage nodes, and returns the acknowledgement (ACK) or no acknowledgement (NACK) messages to the requesting client node according to the storage result.

Figure 5:
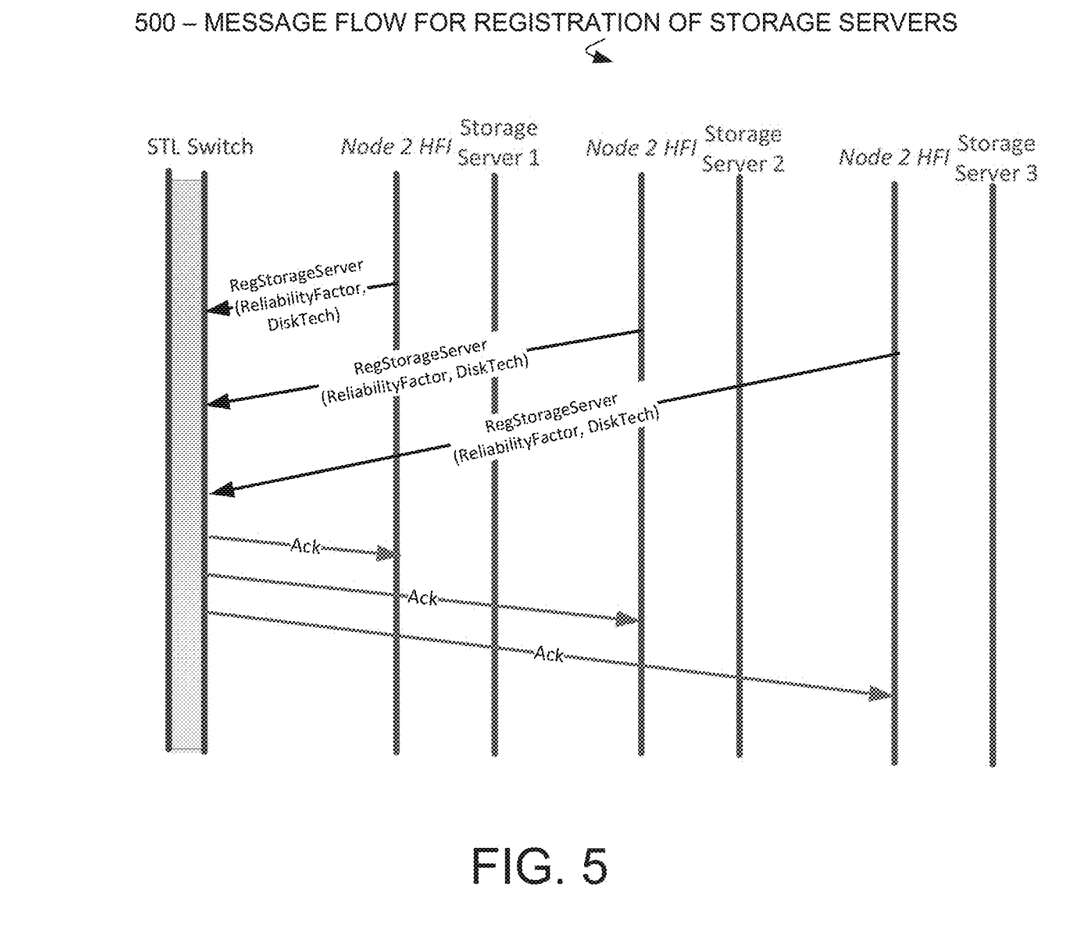
FIGS. 5-7 are message flow diagrams illustrating example message flows in accordance with embodiments of fabric encapsulated resilient storage as shown in FIG. 1.
Figure 6:
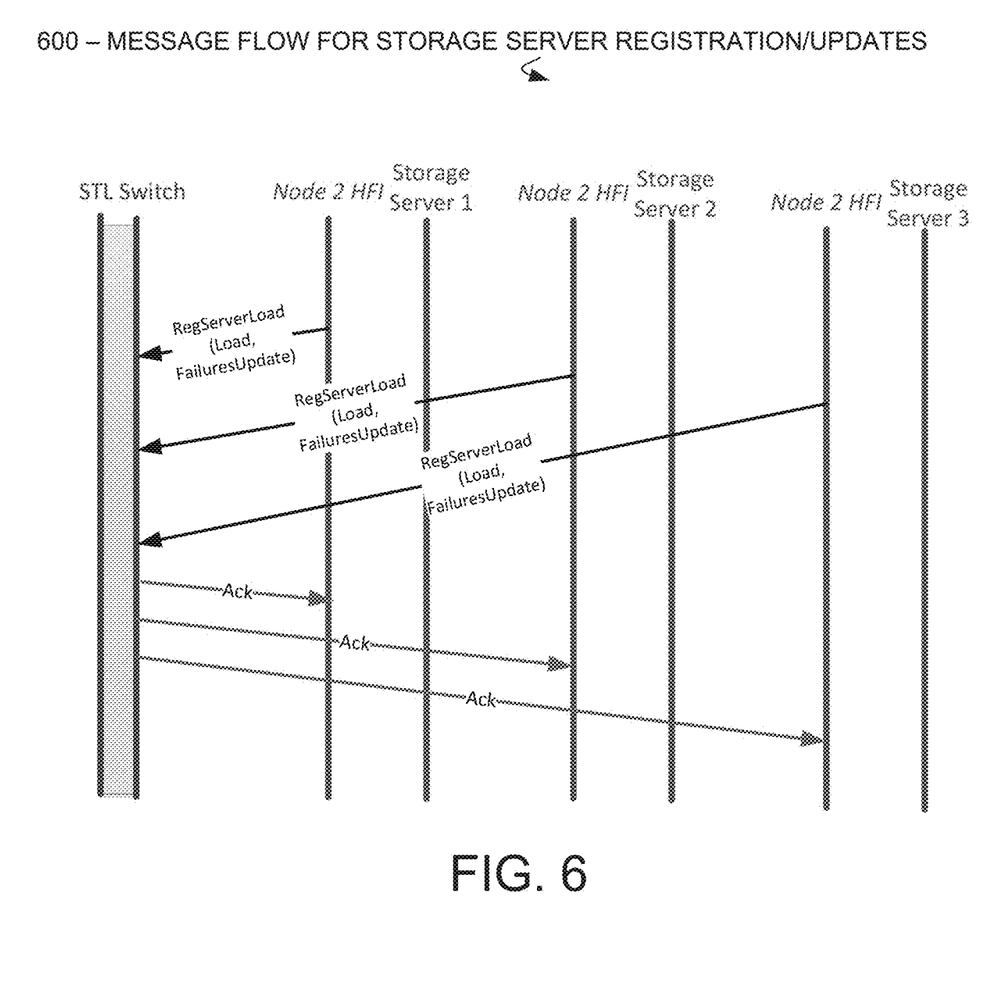
Figure 7:
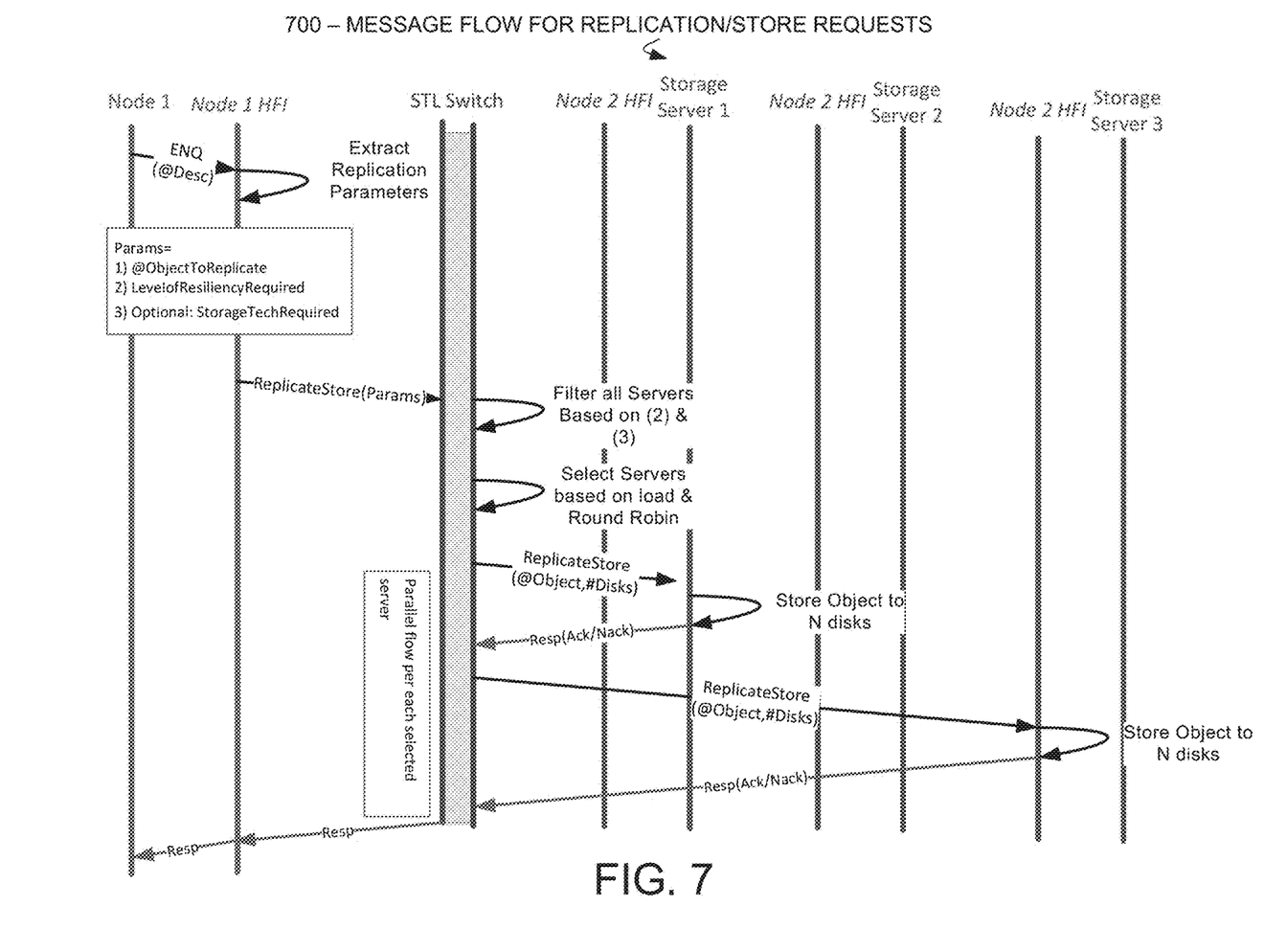

FIGS. 5-7 are message flow diagrams illustrating example message flows in accordance with embodiments of fabric encapsulated resilient storage as shown in FIG. 1. FIG. 5 illustrates a storage server/node registration flow of a new instruction message to register a storage server to the switch. As shown, the storage servers 1, 2 and 3 on respective nodes 2, 3 and 4 each send a registration message, RegStorageServer to the switch along with their current reliability factor and the disk technology characteristics (ReliabilityFactor, DiskTech). In response, an STL switch answers with an ACK as soon as the registration has been completed. In some instances, the switch answers with a NACK in case one of the parameters is invalid or there is no more space for new registrations.

FIG. 6 illustrates a storage server/node registration flow of a new instruction message to update a previously registered storage server to the switch. As shown, the storage servers 1, 2 and 3 on respective nodes 2, 3 and 4 each send a registration message, RegServerLoad, to the switch along with their current load and failures characteristics (Load, FailuresUpdate). In response, the STL switch sends with an ACK as soon as the registration has been completed. As with the new registrations, in some instances the switch answers with a NACK in case one of the parameters is invalid or there is no more space for updated registrations.

FIG. 7 illustrates the resiliency flow of messages for storing an object. For example, Node 1 wants to store an object and specifies a set of parameters: the object being replicated and the level of resiliency required for the object to be stored. Optionally, Node 1 can also specify a requirement for the storage protocol/disk technology used by the disks in the server (SAS HDDs, SATA SSDs, and NVMe SSDs, etc.). Node 1 sends a ReplicateStore message with parameters containing the requested resiliency level and other requirements. Once the request reaches the switch, the reliability logic component on the switch filters the switch's registered storage servers based on the level of resiliency they can provide and, if specified, the storage technology, such as the disk technology DT values registered for the storage servers. Once the switch has filtered the storage servers, it forwards the storage request (RegStorageServer) message instruction to the appropriate storage servers, in this case storage server 1 on Node 2 and storage server 3 on Node 4. Storage server 1 and storage server 3 replicate the write instruction to store replicas of the object if needed and return ACK/NACK messages to the switch according to the storage result. The switch, in turn, relays the storage result to the client node that initiated the request to store the object.

Figure 8:
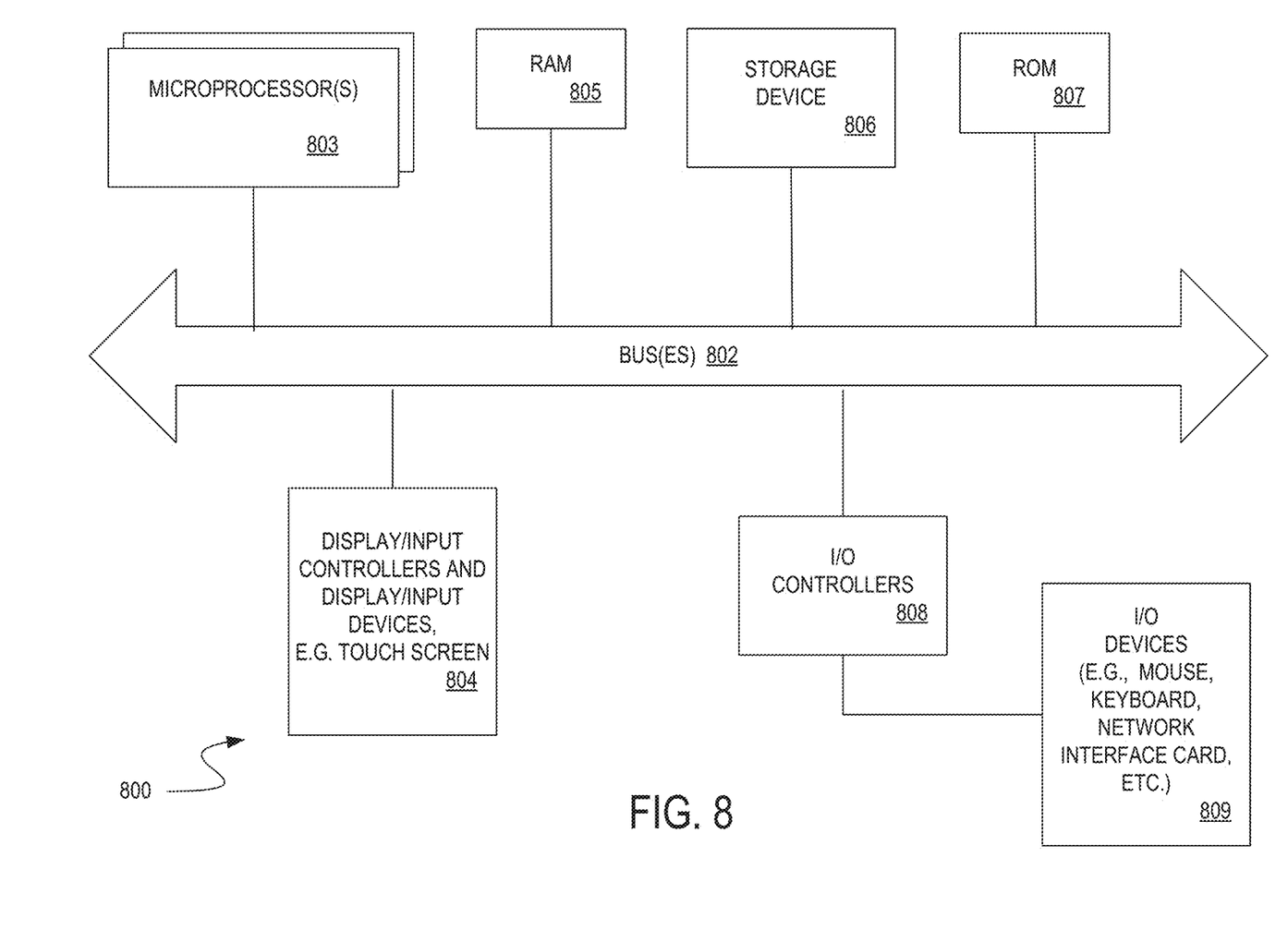
FIG. 8 illustrates an example of a typical computer system in which embodiments of fabric encapsulated resilient storage as described herein could be implemented, either in whole or in part.

FIG. 8 illustrates an example of a typical computer system that can be used in conjunction with the embodiments described herein. Note that while FIG. 8 illustrates the various components of a data processing system, such as a computer system, it is not intended to represent any particular architecture or manner of interconnecting the components as such details are not germane to the described embodiments. It will also be appreciated that other types of data processing systems that have fewer components than shown or more components than shown in FIG. 8 could also be used with the described embodiments. The data processing system of FIG. 8 can be any type of computing device suitable for use as a forwarding device, switch, client, server and the like, of a storage management system. As shown in FIG. 8, the data processing system 800 includes one or more buses 802 that serve to interconnect the various components of the system. One or more processors 803 are coupled to the one or more buses 802 as is known in the art. Memory 805 can be DRAM or non-volatile RAM or can be flash memory or other types of memory described elsewhere in this application. This memory is coupled to the one or more buses 802 using techniques known in the art. The data processing system 800 can also include non-volatile memory 807 that can be an HDD or a flash memory or a magnetic optical drive or magnetic memory or an optical drive or other types of memory systems that maintain data even after power is removed from the system. The non-volatile memory 807 and the memory 805 are both coupled to the one or more buses 802 using known interfaces and connection techniques.

A display controller 804 is coupled to the one or more buses 802 in order to receive display data to be displayed on a display device 804 which can display any one of the user interface features or embodiments described herein. The display device 804 can include an integrated touch input to provide a touch screen.

The data processing system 800 can also include one or more input/output (I/O) controllers 808 which provide interfaces for one or more I/O devices, such as one or more mice, touch screens, touch pads, joysticks, and other input devices including those known in the art and output devices (e.g. speakers). The input/output devices 809 are coupled through one or more I/O controllers 808 as is known in the art.

While FIG. 8 shows that the non-volatile memory 807 and the memory 805 are coupled to the one or more buses directly rather than through a network interface, it will be appreciated that the data processing system may utilize a non-volatile memory which is remote from the system, such as a network storage device which is coupled to the data processing system through a network interface such as a modem or Ethernet interface or wireless interface, such as a wireless WiFi transceiver or a wireless cellular telephone transceiver or a combination of such transceivers.

As is known in the art, the one or more buses 802 may include one or more bridges or controllers or adapters to interconnect between various buses. In one embodiment, the I/O controller 808 includes a USB adapter for controlling USB peripherals and can control an Ethernet port or a wireless transceiver or combination of wireless transceivers.

It will be apparent from this description that aspects of the described embodiments could be implemented, at least in part, in software. That is, the techniques and methods described herein could be carried out in a data processing system in response to its processor executing a sequence of instructions contained in a tangible, non-transitory memory such as the memory 805 or the non-volatile memory 807 or a combination of such memories, and each of these memories is a form of a machine readable, tangible storage medium.

Hardwired circuitry could be used in combination with software instructions to implement the various embodiments. Thus the techniques are not limited to any specific combination of hardware circuitry and software or to any particular source for the instructions executed by the data processing system.

All or a portion of the described embodiments can be implemented with logic circuitry such as a dedicated logic circuit or with a microcontroller or other form of processing core that executes program code instructions. Thus processes taught by the discussion above could be performed with program code such as machine-executable instructions that cause a machine that executes these instructions to perform certain functions. In this context, a "machine" is typically a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture can be used to store program code. An article of manufacture that stores program code can be embodied as, but is not limited to, one or more memories (e.g. one or more flash memories, random access memories (static, dynamic or other)), optical disks, CD-ROMs, DVD ROMs, EPROMs EEPROMs, magnetic or optical cards or other type of machine-readable media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

The term "memory" as used herein is intended to encompass all volatile storage media, such as dynamic random access memory (DRAM) and static RAM (SRAM) or other types of memory described elsewhere in this application. Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The described embodiments also relate to an apparatus for performing the operations described herein. This apparatus can be specially constructed for the required purpose, or it may comprise a general-purpose computer selectively activated or reconfigured by a computer program stored in the computer. Either way, the apparatus provides the means for carrying out the operations described herein. The computer program can be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems can be used with programs in accordance with the teachings herein, or it may prove convenient to construct a more specialized apparatus to perform the operations described. The required structure for a variety of these systems will be evident from the description provided in this application. In addition, the embodiments are not described with reference to any particular programming language. It will be appreciated that a variety of programming languages could be used to implement the teachings of the embodiments as described herein.

In the foregoing specification, embodiments have been described with reference to specific exemplary embodiments. It will be evident that various modifications could be made to the described embodiments without departing from the broader spirit and scope of the embodiments as set forth in the following claims. The specification and drawings are, accordingly, to be regarded in an illustrative sense rather than a restrictive sense.

What is claimed is:

1. A computer-implemented method comprising:
   in a switch having access to storage nodes and client nodes:
   configuring a host fabric interface (HFI) with a hierarchy of levels of resilience;
   determining, from characteristics of each storage node as stored in a storage registration in the switch, a level of resilience in the hierarchy of levels of resilience, the determined level of resilience representing how reliably each storage node stores objects; and
   causing an object to be stored on one or more of the storage nodes based on their respective determined levels of resilience, including
   receiving from the client node a request to store the object at a specified level of resilience,
   determining which storage nodes store objects at the specified level of resilience, and
   initiating a replication flow of messages to cause the object to be stored on any one or more of the storage nodes that store objects at the specified level of resilience, wherein the level of resilience specified in the request is obtained through the HFI.

2. The computer-implemented method of claim 1, further comprising, in the switch:
   determining none of the storage nodes store objects at the specified level of resilience; and forwarding the request to another switch configured to access other storage nodes that store objects at the specified level of resilience.

3. The computer-implemented method of claim 1, further comprising, in the switch:
   receiving the request from a storage node unable to store the object at the specified level of resilience.

4. The computer-implemented method of claim 1, further comprising, in the switch:
   configuring a granularity of the hierarchy of levels of resilience into which characteristics of each storage node are abstracted, wherein hierarchies configured with greater granularity cause the storage characteristics to be abstracted into a greater number of levels of resilience than hierarchies configured with lesser granularity.

5. The computer-implemented method of claim 1, wherein how reliably the storage node stores objects represents one or more of an assurance of availability of stored objects and a protection against loss of stored objects, the assurance of availability and the protection against loss inferred from the storage characteristics of the storage node.

6. The computer-implemented method of claim 1, wherein:
   the characteristics include any one or more of a static characteristic and a dynamic characteristic; and
   further wherein the static characteristic is any one or more of a predefined reliability factor quantifying a reliability profile of the storage node, a number of disks comprising the storage node, and a type of disk technology used by the storage node, and the dynamic characteristic is any one or more of a load and an availability of the storage node over time.

7. The computer-implemented method of claim 1, further comprising, in the switch:
   registering the characteristics of the storage nodes in a memory of the switch; and
   updating the registered characteristics in the memory to reflect changes in the characteristics of the storage nodes.

8. A system comprising:
a switch having a storage registration configured to store characteristics of storage servers accessible through the switch, a host fabric interface (HFI) to the switch configured to expose a hierarchy of levels of resilience to clients in communication with the switch;
a processor on the switch configured to determine, from the stored characteristics of each storage server as stored in the storage registration, a level of resilience in the hierarchy of levels of resilience, the determined level of resilience representing how reliably each storage node stores objects; and
a fabric on the switch configured to cause objects to be stored on one or more of the storage servers based on their respective determined levels of resilience;
an ingress queue in the switch to receive requests from the clients to store objects;
the processor configured to determine which storage servers store objects at a requested level of resilience responsive to receiving a request to store an object at the requested level of resilience, wherein the level of resilience specified in the request is obtained through the HFI; and
the fabric initiating a replication flow of messages to cause the object to be stored on any one or more of the storage servers determined to store objects at the requested level of resilience.

9. The system of claim 8, further comprising:
the processor determining that none of the storage servers accessible through the switch store objects at the requested level of resilience; and
the fabric forwarding the request to another switch configured to access other storage servers that store objects at the specified level of resilience.

10. The system of claim 8, wherein the ingress queue is to receive the requests from a remote storage server unable to store objects at the requested level of resilience.

11. The system of claim 8, wherein the hierarchy of levels of resilience into which the processor abstracts the characteristics of each storage node is configurable to provide clients with varied levels of resilient storage.

12. The system of claim 8, wherein how reliably each storage server stores objects represents one or more of an assurance of availability of stored objects and a protection against loss of stored objects, the assurance of availability and the protection against loss inferred from the storage characteristics of the storage server.

13. The system of claim 8, wherein:
the characteristics include any one or more of a static characteristic and a dynamic characteristic; and
further wherein the static characteristic is any one or more of a predefined reliability factor quantifying a reliability profile of the storage node, a number of disks comprising the storage node, and a type of disk technology used by the storage node, and the dynamic characteristic is any one or more of a load and an availability of the storage node over time.

14. The system of claim 8, further comprising:
the processor configured to update the characteristics stored in the switch's memory to reflect changes in the characteristics of the storage servers.

15. At least one non-transitory computer readable storage medium including instructions that, when executed on a machine, cause the machine to:
configure a host fabric interface (HFI) with a hierarchy of levels of resilience;
determine, in a switch, from characteristics of a storage server in communication with the switch and the machine as stored in a storage registration in the switch, a level of resilience in the hierarchy of levels of resilience, the determined level of resilience representing how reliably the storage server stores objects; and
store an object on the storage server based on the determined level of resilience, wherein the object is stored on the storage server based on the abstracted level of resilience by:
receiving from a client in communication with the machine a request to store the object at a requested level of resilience,
determining whether the storage server stores objects at the requested level of resilience, and
initiating a replication flow of messages to the storage server that cause the storage server to store the object at the requested level of resilience, wherein the level of resilience specified in the request is obtained through the HFI.

16. The at least one non-transitory computer readable storage medium of claim 15, wherein the characteristics include any one or more of a static characteristic and a dynamic characteristic; and
further wherein the static characteristic is any one or more of a predefined reliability factor quantifying a reliability profile of the storage server, a number of disks comprising the storage server, and a type of disk technology used by the storage server, and the dynamic characteristic is any one or more of a load and an availability of the storage server over time.

* * * * *